Aug. 28, 1951  H. P. CORDES  2,565,548
PLANT SETTER
Filed July 20, 1945  2 Sheets-Sheet 2
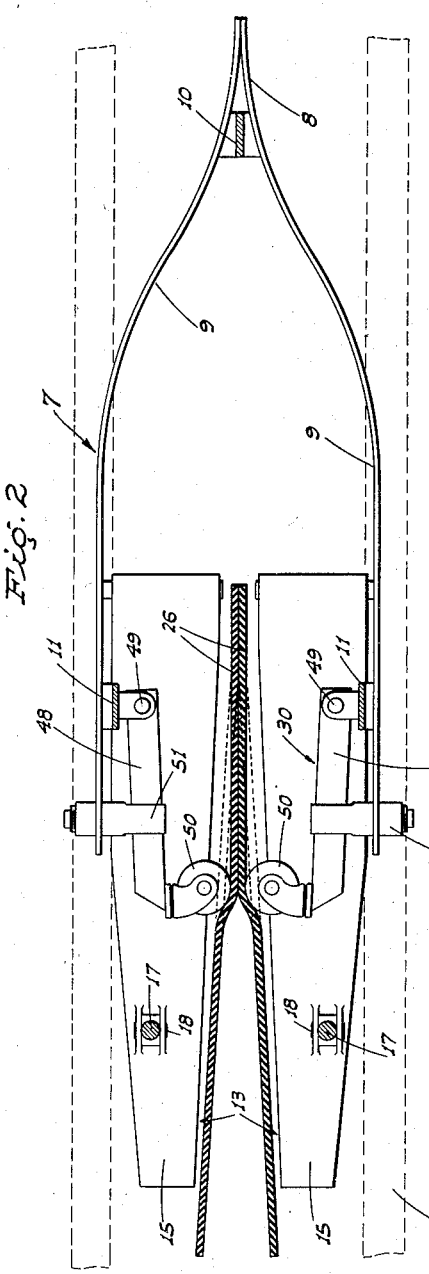
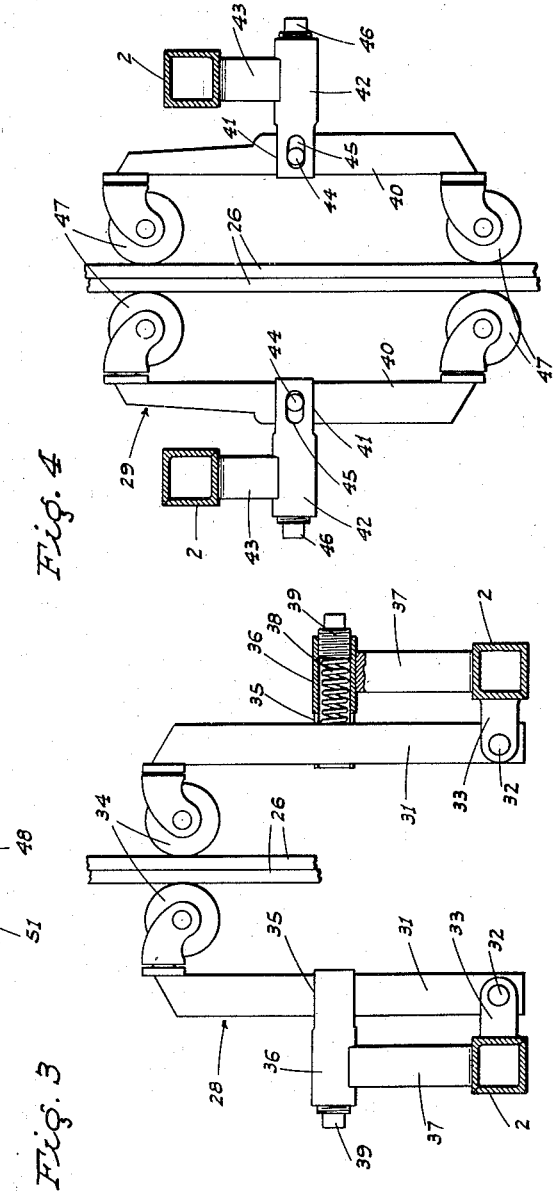
INVENTOR.
H. P. Cordes
BY
Webster & Webster
ATTYS Patented Aug. 28, 1951

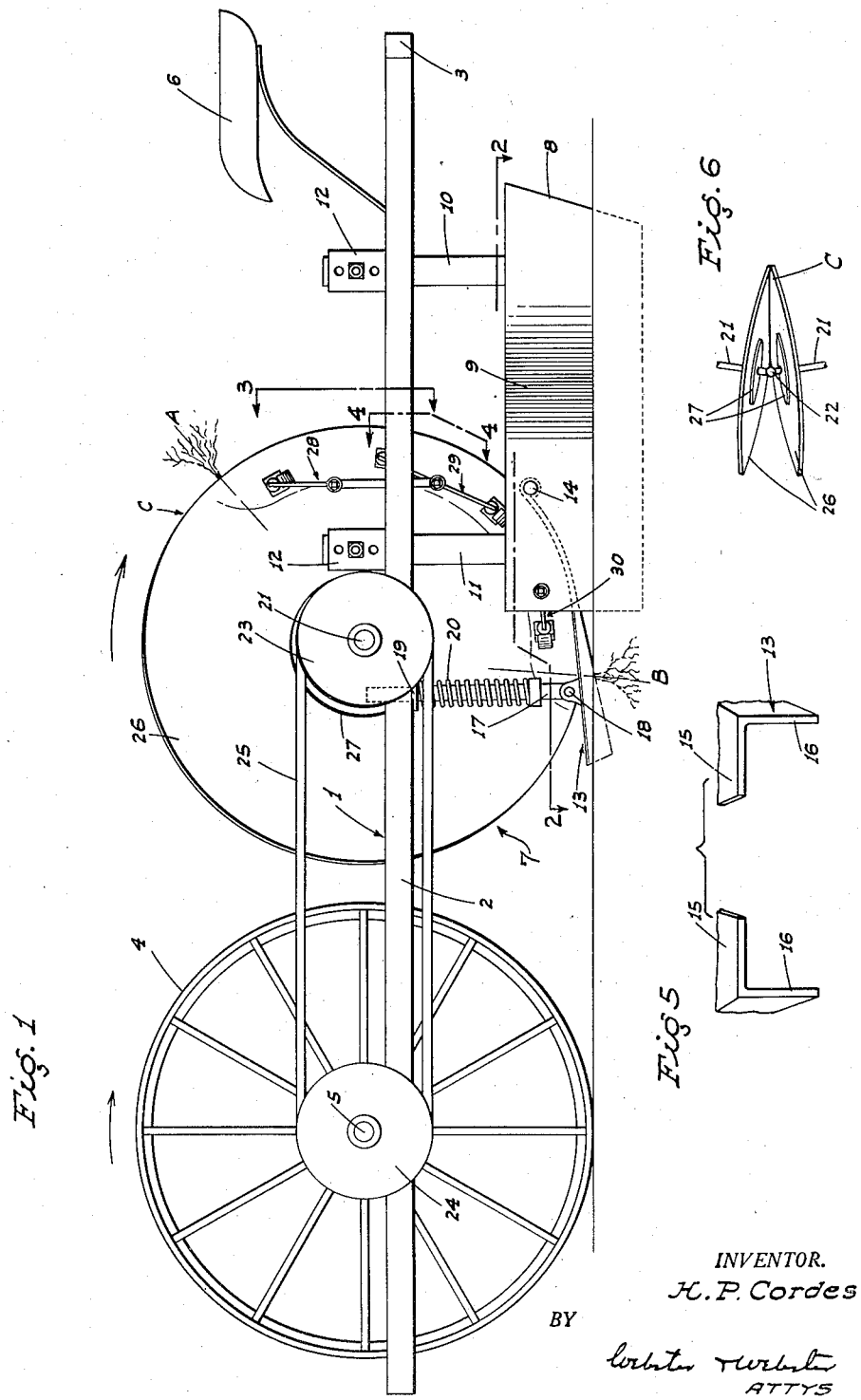

2,565,548

UNITED STATES PATENT OFFICE 2,565,548

PLANT SETTER

Henry P. Cordes, Modesto, Calif.

Application July 20, 1945, Serial No. 606,126

1 Claim. (Cl. 111—3)

1

This invention is directed to a row crop planting machine, and in particular represents improvements over the machine shown in my issued United States Patent No. 2,348,787, dated May 16, 1944.

One feature of the present invention is the improved spring pressed roller units employed in the machine to maintain the cooperating pair of flexible and resilient discs in the desired frictional, plant holding relation through an arc of contact from a plant receiving point some distance above the ground to a plant discharge point adjacent the ground; said rollers being caster mounted whereby to follow or track on the engaged discs.

Another feature of the invention is the novel furrow opening and closing unit now embodied in the machine; the furrow opener including transversely spaced, upstanding side wings or plates, and the furrow closer including soil deflecting members secured to corresponding ones of said plates in trailing and converging relation.

An additional feature of the invention is the simplification of the machine, while providing a machine which is exceedingly effective for the purpose for which it is designed.

These objects are accomplished by means of such structure and relative arrangement of parts as will fully appear by a perusal of the following specification and claims.

Figure 1 is a side elevation of the machine.

Figure 2 is an enlarged sectional plan on line 2—2 of Fig. 1.

Figure 3 is an enlarged fragmentary cross section on line 3—3 of Fig. 1.

Figure 4 is an enlarged fragmentary cross section on line 4—4 of Fig. 1.

Figure 5 is a rear end view of the furrow closer.

Figure 6 is a fragmentary plan view of the planting mechanism, detached.

Referring now more particularly to the characters of reference on the drawings, the implement comprises a longitudinally extending main frame 1 disposed horizontally above the ground and including rigid side beams 2. At its forward end 3 the frame 1 is adapted for connection in draft relation to a tractor, while the rear end of said main frame is supported by relatively large-diameter, transversely spaced ground engaging wheels 4 carried on a cross shaft 5. Adjacent its forward end the main frame 1 supports a rearwardly facing operator's seat 6, and the plant holding and depositing mechanism, which is indicated generally at 7, is mounted on the frame between said seat and the rear

2 wheels 4; the structure of said mechanism being hereinafter described in detail.

Directly ahead of the mechanism 7 and below the frame 1 there is provided a furrow opener 8 which includes a pair of upstanding, transversely spaced side wings or plates 9 which first diverge from the point of the furrow opener and thence extend rearwardly in substantially parallel relation. The furrow opener is adjustably suspended from the main frame 1 by a forward and centrally disposed upstanding post 10, and a rearward pair of transversely spaced posts 11; the lower ends of the latter posts being fixed to the side plates 9 on the inside and adjacent the rear ends thereof. The posts 10 and 11 are vertically adjustably mounted by means of adjustment bracket units, indicated at 12.

The above described furrow opener includes, in unitary relation therewith, the following furrow closing means:

The furrow closer comprises a pair of transversely spaced, rearwardly extending soil deflectors 13, which extend at a rearward incline, and in slight converging relation to each other, from a pivotal connection 14 with corresponding side plates 9 of the furrow opener 8. The pivotal connections 14 are secured in connection with said side plates 9 toward the rear of the latter and adjacent their upper edges, whereby said soil deflectors may extend downwardly and converge slightly, as defined. The soil deflectors 13 each include a top plate 15 and an outer side skirt 16 which has its inception intermediate the ends of the soil deflector and increases in depth toward the rear end of the same.

Each of the soil deflectors 13 is urged downwardly by a push rod 17 which is pivoted to said deflector intermediate its ends, as at 18, and extends upwardly through a frame-supported guide 19; a compression spring 20 surrounding said rod whereby to urge the same downward.

It will thus be seen that with advance of the implement the furrow opener 8 will open a furrow disposed longitudinally and centrally below the main frame 1, and that at a rearward point the furrow closer, including the soil deflectors 13, will close such furrow. The plant holding and depositing mechanism 7 is mounted on the main frame 1 so as to deposit plants in said furrow after opening of the same, and ahead of but adjacent the point of closing thereof.

The plant holding and depositing mechanism 7 comprises, in detail, the following:

A pair of relatively short shafts 21 are journaled in and extend inwardly from the side beams 2 in converging relation and at a rearward and slightly upward angle; said shafts being connected at their adjacent ends by a universal joint 22.

One of the shafts 21 is driven from the cross shaft 5 by means of a pulley 23 on said one shaft 21, another pulley 24 on the cross shaft 5, and an endless belt or chain 25 connecting said pulleys. With advance of the implement the shafts 21 are thus rotated in the same direction as the direction of turning of the wheels 4.

A pair of relatively large diameter, flexible and resilient discs 26 are mounted on shafts 21 by means of hubs 27; the discs 26 being of rubber or the like and fabric reinforced to the extent that said discs are self-supported and relatively stiff. By reason of the rearward and upward angling of the convering shafts 21 the discs, when mounted radially thereon, are disposed in a forwardly and downwardly converging relation, whereby said discs frictionally engage and run together from a point substantially at A, within reach of the operator's seat, to approximately the low point B of the discs, and which latter point is substantially the point of closest approach of said discs to the furrow opened by the furrow opener 8. The points A and B are indicated by the broken lines, as shown in Fig. 1.

While the discs 26 run together through an arc of contact which extends substantially between the points A and B in the direction of rotation of said discs, it is desirable that the latter be positively and frictionally maintained in contact throughout said arc by independent pressure means. Such independent pressure means is shown, in the present embodiment, as a plurality of spring pressed, caster-mounted roller units. There are three units on each side of the disc assembly; the top unit being indicated generally at 28; the intermediate unit being indicated generally at 29, and the bottom unit being indicated generally at 30. These roller units 28, 29 and 30 extend in spaced relation substantially circumferentially of the disc assembly along the arc of contact of said discs between the points A and B; the corresponding units on opposite sides of said discs assembly being disposed in matching cooperative relation.

Each of the top roller units 28, the pair of which is shown in detail in Fig. 3, comprises an upstanding lever 31 pivotally mounted at its lower end, as at 32, between a pair of ears 33, which project laterally inward from the adjacent side beam 2; the lever 31 thus being mounted for swinging movement laterally of the disc assembly. At its outer end the lever 1 is fitted with an inwardly projecting caster-mounted roller 34 which rides the corresponding disc 26 adjacent but short of the periphery thereof. The rollers 34 on opposite sides of the disc assembly are disposed in matching relation, as shown. Intermediate its ends the lever 31 extends through a slot or saddle 35 in a sleeve 36 disposed at right angles to said lever and mounted on an upstanding arm 37. A compression spring 38 in the sleeve 36 engages the lever 31 and spring-urges the same in a direction to cause the corresponding caster-mounted roller 34 to frictionally engage the adjacent disc 26. An adjustment plug 39 in the outer end of the sleeve 36 is used to vary the compression of the spring 38, and consequently the pressure of the roller 34 on the disc.

Each of the intermediate roller units 29, the pair of which is shown in Fig. 4, comprises an equalizing lever 40 which extends in a direction substantially circumferentially of the disc assembly, said lever passing, intermediate its ends, through a saddle 41 on the inner end of a sleeve 42 suspended at right angles to said lever from the adjacent side beam 2 by a bracket 43. The equalizing lever 40 includes oppositely projecting pins 44 which ride in longitudinally elongated slots 45 in opposite sides of the saddle 41. A compression spring in the sleeve 42 between the latter and an adjustment plug 46 urges the equalizing lever 40 toward the disc assembly, and said lever 40 is fitted, at opposite ends, with caster-mounted rollers 47.

Each of the bottom roller units, the pair of which is shown in Fig. 2, is constructed much the same as the top roller units 28, and comprises a lever 48 pivotally mounted, as at 49, in connection with the lower end portion of the corresponding post 11, and thence extends rearwardly for lateral swinging movement relative to the disc assembly; there being a caster-mounted roller 50 on the rear end of the lever 48. The lever 48 is spring-pressed by a slotted sleeve and spring unit 51 of the same structure as described in connection with the top units 28; the slotted sleeve and spring unit 51 being fixed in connection with and projecting inwardly from the corresponding side plate of the furrow opener 8.

In operation, the operator sits on the seat 6, and from a supply of young plants (not shown) successively places individual plants in the cradle C, formed by the approaching discs 26 slightly ahead of the point A; the plants being so deposited in the mechanism at spaced intervals determined by any suitable timing device, which spacing also controls the spacing of the plants in the row. The plants are deposited in the disc assembly with the root portions projecting outwardly of the periphery of said discs, as illustrated. As the discs 26 run together from the point A to the point B, and which frictional contact is assured and enhanced by the described roller units 28—30 inclusive, the plants are positively carried about to said point B. As the plants reach the point B, and at which time the roots are lowermost, the discs 26 leave the caster-mounted rollers 50 and immediately separate, as clearly shown in Fig. 2, and when the discs thus separate the plants drop into the furrow slightly ahead of the point at which the furrow is closed by the soil deflectors 13. As the low point of the disc assembly runs relatively close to the ground the plants are effectively set in the furrow in an upright position, with little likelihood of upsetting, particularly as the furrow is closed almost immediately after deposit of said plants in the furrow.

With a disc assembly of the type described, plants of various sizes, i. e. of different stalk diameter, may be planted effectively; the spring load against the caster-mounted rollers being adjusted to assure proper frictional engagement of the discs with the stalks without crushing the latter. In addition, the arrangement of the roller units is such that the pressure of the frictional contact on stalks between the discs can be maintained substantially equal between the points A and B, as is desirable.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful and upon which Letters Patent is desired:

In a row crop setting implement, a frame, a pair of facing, flexible and resilient discs supported on the frame for simultaneous rotation in a predetermined direction, means to rotate the discs, the discs converging in a direction such that the same run together through a peripheral arc of contact extending from a point some distance above ground to another point adjacent the ground, and a plurality of pressure roller units engaging the discs, on opposite sides, in spaced relation along said arc of contact; one of said units including a lever, means pivotally mounting the lever intermediate its ends for swinging movement thereof transversely of the adjacent disc, and a disc engaging roller on each end of the lever, the roller units being so spaced along the said arc of contact of the discs as to positively hold the discs in face to face relation throughout such arc of contact, said pivotal mount including a cross pin on the lever, means mounted on the frame supporting the cross pin for rotation and for movement toward or away from said adjacent disc, and a spring arranged in connection with said pin supporting means engaging and yieldably urging the lever toward the disc.

HENRY P. CORDES.

REFERENCES CITED

The following references are of record in the file of this patent:

UNITED STATES PATENTS

| Number | Name | Date |
| --- | --- | --- |
| 622,586 | Allison et al. | Apr. 4, 1899 |
| 1,093,773 | Ellison | Apr. 21, 1914 |
| 1,226,800 | Olson | May 22, 1917 |
| 1,306,586 | Duke | June 10, 1919 |
| 1,329,375 | Collins | Feb. 3, 1920 |
| 1,653,786 | Shell | Dec. 27, 1927 |
| 1,838,535 | Dattisman | Dec. 29, 1931 |
| 1,901,299 | Johnson | Mar. 14, 1933 |
| 1,928,362 | Schutmaat | Sept. 26, 1933 |
| 2,331,520 | Urschel | Oct. 12, 1943 |
| 2,348,787 | Cordes | May 16, 1944 |

FOREIGN PATENTS

| Number | Country | Date |
| --- | --- | --- |
| 439,748 | Germany | Jan. 17, 1927 |